United States Patent
Chen et al.

(10) Patent No.: US 11,221,045 B2
(45) Date of Patent: Jan. 11, 2022

(54) THIN-WALL BEARING AND PROCESSING METHOD THEREOF

(71) Applicant: JIANGSU WANDA SPECIAL BEARING CO., LTD., Jiangsu (CN)

(72) Inventors: Baoguo Chen, Jiangsu (CN); Cheng Wang, Jiangsu (CN); Jing Guo, Jiangsu (CN)

(*) Notice: Subject to any disclaimer, the term of this patent is extended or adjusted under 35 U.S.C. 154(b) by 1 day.

(21) Appl. No.: 16/764,382

(22) PCT Filed: Apr. 26, 2019

(86) PCT No.: PCT/CN2019/084461
§ 371 (c)(1),
(2) Date: May 14, 2020

(87) PCT Pub. No.: WO2020/215298
PCT Pub. Date: Oct. 29, 2020

(65) Prior Publication Data
US 2021/0231174 A1    Jul. 29, 2021

(30) Foreign Application Priority Data
Apr. 26, 2019  (CN) .......................... 201910341772.4

(51) Int. Cl.
*F16C 33/58*  (2006.01)
*F16C 19/16*  (2006.01)
*F16C 43/04*  (2006.01)

(52) U.S. Cl.
CPC ............ *F16C 33/583* (2013.01); *F16C 19/16* (2013.01); *F16C 43/04* (2013.01); *F16C 2226/60* (2013.01); *F16C 2240/46* (2013.01)

(58) Field of Classification Search
CPC ...... F16C 19/16; F16C 33/583; F16C 33/586; F16C 43/04; F16C 2226/12; F16C 2226/60; F16C 2240/56
See application file for complete search history.

(56) References Cited

U.S. PATENT DOCUMENTS 4,396,309 A *  8/1983  McCormick ............ F16B 19/02
                                                    403/14
10,465,751 B2 * 11/2019 Gillengerten ......... F16C 33/586
(Continued)

FOREIGN PATENT DOCUMENTS

CN    201802755 U   4/2011
CN    104006071 A   8/2014
(Continued)

OTHER PUBLICATIONS

International search report of PCT/CN2019/084461.

*Primary Examiner* — Alan B Waits

(57) ABSTRACT

A thin-wall bearing, including an outer ring and an inner ring. The inner ring surface of the outer ring is provided with an outer ring raceway, and the outer ring surface of the inner ring is provided with an inner ring raceway. A steel ball and a cage for installing the steel ball are arranged between the outer ring raceway and the inner ring raceway. A plurality of screw holes are evenly distributed in a circle around the side wall of the outer ring, and knurled screws are provided in the screw holes, respectively. The fit between the knurled screw and the screw hole 10-Φ9 is to be N6/h5. The radial clearance of the thin-wall bearing is greater than or equal to 0.01 but less than or equal to 0.09. A processing method of the thin-wall bearing.

3 Claims, 1 Drawing Sheet

(56) References Cited

U.S. PATENT DOCUMENTS

| | | | | |
|---|---|---|---|---|
| 2007/0269155 | A1* | 11/2007 | Mori | ............... B60B 27/00 384/544 |
| 2012/0161501 | A1* | 6/2012 | Knopf | ............. F16C 33/581 301/109 |
| 2017/0321753 | A1 | 11/2017 | Gillengerten | |
| 2018/0135702 | A1* | 5/2018 | Nakatsuji | ............. F16C 35/06 |

FOREIGN PATENT DOCUMENTS

| | | |
|---|---|---|
| CN | 203979126 U | 12/2014 |
| CN | 204025362 U | 12/2014 |
| CN | 106078085 A | 11/2016 |
| JP | 2012193859 A | 10/2012 |

\* cited by examiner

THIN-WALL BEARING AND PROCESSING METHOD THEREOF

CROSS REFERENCE TO RELATED APPLICATION

This application is a continuation of International Patent Application No. PCT/CN2019/084461, filed on Apr. 26, 2019, which claims priority benefit of Chinese Patent Application No. 201910341772.4, filed on Apr. 26, 2019, and the entire contents of which are incorporated herein by reference.

TECHNICAL FIELD

The present disclosure relates to the technical field of bearing processing, in particular to a thin-wall bearing, and a processing method thereof.

BACKGROUND

In the past, there were some problems in the processing of thin-wall bearing, as follows:

The fit between the knurled screw and the hole is 10-φ9 (N6/h5), which is difficult to process in practice.

Regarding the fit between the knurled screw and the screw hole, the knurled screw is non-standard screw, after assembly, the large-diameter knurled screw will squeeze the outer ring of the bearing due to the thin thickness of the thin-wall bearing, so that the radial clearance of the bearing will be reduced, thereby the assembled bearing often cannot rotate well and even fails to rotate after the knurled screw is installed;

Further, the big difference of the knurled screw in knurled size causes the knurled screw to be too tight or loose in actual installation.

SUMMARY

In order to solve the above problems, the present disclosure is to provide a thin-wall bearing and a processing method thereof.

The technical solution of the present disclosure is shown as below:

A thin-wall bearing, including an outer ring and an inner ring, an outer ring raceway is arranged on an inner ring surface of the outer ring, an inner ring raceway is arranged on an outer ring surface of the inner ring, a steel ball and a cage for installing the steel ball are arranged between the outer ring raceway and the inner ring raceway. Wherein a plurality of screw holes are evenly distributed in a circle around the side wall of the outer ring evenly, a size of each of the plurality of screw holes is Φ9, and a knurled screw is provided in each of the plurality of screw holes, respectively. A fit between the knurled screw and each of the plurality of screw holes is N6/h5, and a radial clearance of the thin-wall bearing is greater than or equal to 0.01 but less than or equal to 0.09.

The processing method of the thin-wall, bearing as described above, wherein the knurled screw is a non-standard screw, and there is a diameter difference between its dimensions, including the following process steps:

Bearing Processing

Processing the outer ring, the inner ring, the cage and the steel ball according to the process size and requirements of the thin-wall bearing.

Bearing Assembly

Assembling the outer ring, the inner ring, the steel ball and the cage together after processed.

Installing Knurled Screw

Screwing the knurled screws into the screw holes on the outer ring respectively to finish the processing of thin-wall bearing.

The processing method of the outer ring in step (1) is as follows: forging bar stock or tube stock first, annealing the rough blank after forging, then performing turning and screw hole processing to obtain a processed semi-finished product, performing heat treatment and quenching on the processed semi-finished product, then grinding two end faces of the processed semi-finished product, then performing rough grinding on an outer circle surface of the outer ring, then performing fine grinding on the outer circle surface of the outer ring, and then performing rough grinding and fine grinding on the outer ring raceway, and finally carrying out demagnetization cleaning.

The processing method of the screw hole: unifying the size of the knurled screw, controlling the diameter difference, determining the size of the screw hole, and performing hole drilling; according to the actual diameter of the knurled screw, applying a reamer to carry out actual differential reaming to complete the processing of the screw hole; controlling the interference amount between the screw hole and the knurled screw≤0.015.

Controlling a minimum clearance of the bearing to be 0.045 in the bearing assembly in step 2.

To further improve and refine the above technical solution, verifying a deformation amount of the screw hole after the heat treatment and the quenching of the outer ring through the process test in step (1), and modifying the reaming size of the screw hole before the quenching.

The present disclosure has the advantages of reasonable design and ingenious conception, and has the following advantageous effects:

By controlling the diameter differences of the non-standard knurled screws to ensure the possibility of universal fitting, improve the installation efficiency, and save assembly time.

By using of a reamer matching difference to effectively ensure the actual interference amount between the screw and the hole, and the process quality is more stable, The deformation correction amount of the mounting hole obtained after the heat treatment process verification is more accurate, and the heat treatment process parameters of the product are fixed.

In the figure, 1—the outer ring, 2—inner ring, 3—steel ball, 4—cage, 5—sealing ring, 6—screw hole, 7—knurled screw.

DETAILED DESCRIPTION OF THE EMBODIMENTS

Figure 1:
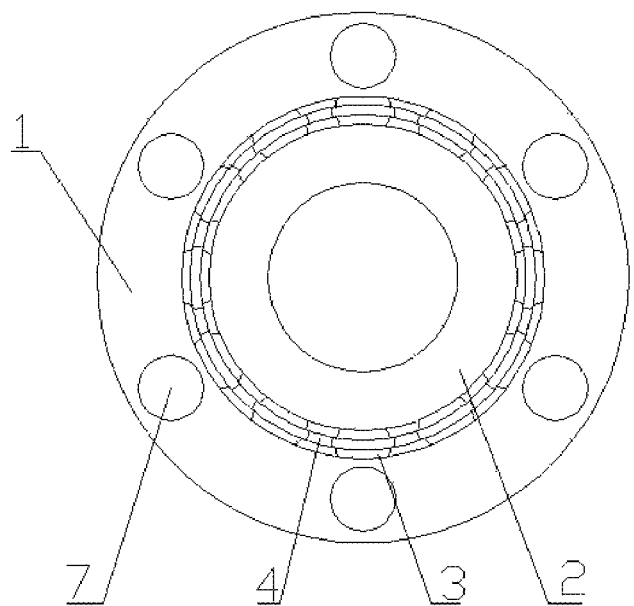
FIG. 1 is the structural diagram of thin-wall bearing.
Figure 2:
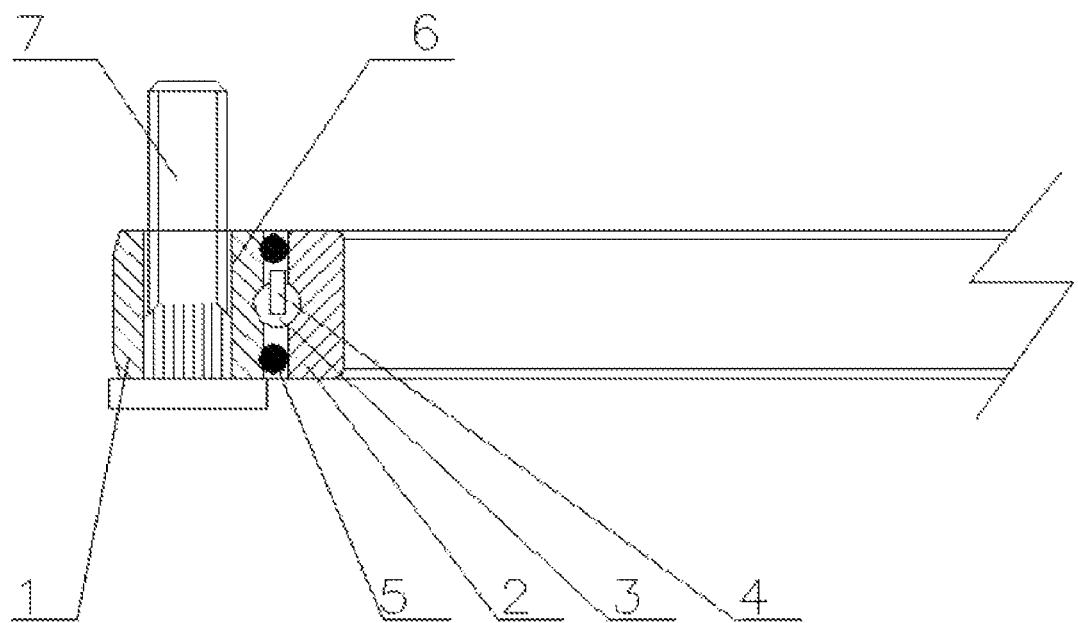
FIG. 2 is a partial half section diagram of thin-wall bearing.

As shown in FIGS. 1-2, a thin-wall bearing includes an outer ring 1 and an inner ring 2. The inner ring surface of the outer ring 1 is provided with an outer ring raceway, and the outer ring surface of the inner ring 2 is provided with an inner ring raceway. A steel ball 3 and a cage 4 for installing the steel ball 3 are provided between the outer ring raceway and the inner ring raceway. And further, a seal ring 5 is provided between the outer ring 1 and the inner ring 2. There are 10 of screw holes 6 are evenly distributed around the side wall of the outer ring 2 in a circle, the size of the screw holes 6 are Φ9. The screw holes 6 are respectively provided with knurled screws 7, and the fit between the screw holes 6 and the knurled screw 7 is N6/h5. The radial clearance of the thin-wall bearing is greater than or equal to 0.01 but less than or equal to 0.09.

A processing method of the thin-wall bearing described above, the knurled screw 7 is a non-standard screw, and there is a difference in diameter between the sizes of the knurled screw. The processing method including the steps as below:

Bearing Processing

According to the process size and requirements of thin-wall bearing, the outer ring 1, the inner ring 2, the cage 4, and the steel ball 3 are processed, respectively;

Bearing Assembly

The outer ring 1, inner ring 3, steel ball 3 and cage 4 are assembled together after processed;

Installing Knurled Screws

The knurled screws 5 are screwed into the screw holes 6 on the outer ring 1 to complete the processing of thin-wall bearing.

In the processing method of the outer ring 1 described in step (1), the bar stock or tube stock is forged first, the rough blank is annealed after forging, then the turning process and the screw hole process are performed, and the processed semi-finished product is performed heat treatment and quenching, and then the two end faces of the processed semi-finished product is performed grinding. And then, rough grinding is performed on the outer circle surface of the outer ring, then fine grinding is performed on the outer circle surface of the outer ring, then rough grinding and fine grinding are performed on the outer raceway, and finally demagnetize cleaning is carried out.

Processing method of screw hole 6; the size of the knurled screw 7 is unified to be 9 mm, the diameter difference from each other is controlled by +0.05 mm, the size of screw hole 6 is determined to be 8.7 mm, and drilling a hole by 8.7 mm drill bit; according to the actual diameter of knurled screw 7, a 9 mm reamer is used for actual reaming to complete the processing of the screw hole 6. The interference amount between the screw hole 6 and the knurled screw 7 is controlled to be ≤0.015, that is to say, the knurled screw is used for trial insertion, and it can be tapped gently without loosening. Through the process test to verify the deformation amount of the screw hole 6 after heat treatment and quenching, has performed on the outer ring 1, to correct the reaming size of the screw hole 6 before quenching.

The minimum clearance of the bearing is controlled to be 0.045 in the bearing assembly in step 2.

Due to the limited expression of words and the infinite concrete structure objectively, for those ordinary person skilled in the art, without departing from the principle of the present disclosure, various improvements, modifications or changes can be made, or the above technical features can be combined in a certain way by the those ordinary person skilled in the art, when these improvements, modifications, changes or combinations, or the solution using the concept and the solution of the present disclosure without improvement is directly applied to other occasions, it should be regarded as falling into the scope of the present disclosure.

What is claimed is:

1. A bearing, comprising an outer ring and an inner ring, an outer ring raceway is arranged on an inner ring surface of the outer ring, an inner ring raceway is arranged on an outer ring surface of the inner ring, a steel ball and a cage for installing the steel ball are arranged between the outer ring raceway and the inner ring raceway, wherein a plurality of screw holes are evenly distributed in a circle around the side wall of the outer ring, a diameter of each of the plurality of screw holes is 9 mm, a knurled screw is provided in each of the plurality of screw holes, a fit between the knurled screw and each of the plurality of screw holes is N6/h5, and a radial clearance of the bearing is greater than or equal to 0.01 mm but less than or equal to 0.09 mm.

2. A processing method of the bearing of claim 1, wherein the knurled screws are non-standard screws, wherein the processing method comprises the following process steps:

processing the bearing, comprising processing the outer ring, the inner ring, the cage and the steel ball according to a process size and requirements of the bearing by forging bar stock or tube stock first to obtain a rough blank, then annealing the rough blank, then performing turning and screw hole processing to obtain a processed semi-finished product, performing heat treatment and quenching on the processed semi-finished product, then grinding two end faces of the processed semi-finished product, then performing grinding on an outer circle surface of the outer ring, then performing finer grinding on the outer circle surface of the outer ring, and then performing grinding on the outer ring raceway, and finally carrying out demagnetization cleaning;

wherein the screw hole processing comprises unifying a size of the knurled screw to control the fit, determining the size of the screw hole, and performing hole drilling; applying a reamer to carry out actual differential reaming to complete the processing of the screw hole according to the actual diameter of the knurled screw; controlling an interference amount between the plurality of screw holes and the knurled screw<0.015 mm;

assembling the bearing, comprising assembling the outer ring, the inner ring, the steel ball and the cage together after being processed; controlling a minimum clearance of the bearing to be 0.045 mm; and installing the knurled screws, comprising screwing the knurled screws into the plurality of screw holes on the outer ring respectively to finish the processing of the bearing.

3. The processing method according to claim 2, wherein verifying a deformation amount of the plurality of screw holes after the heat treatment and the quenching of the outer ring through a process test in the step of processing the bearing, and modifying a reaming size of the plurality of screw holes before the quenching.

* * * * *